Sept. 6, 1927.
L. E. TROTTER
PNEUMATIC TIRE
Filed Jan. 18, 1923
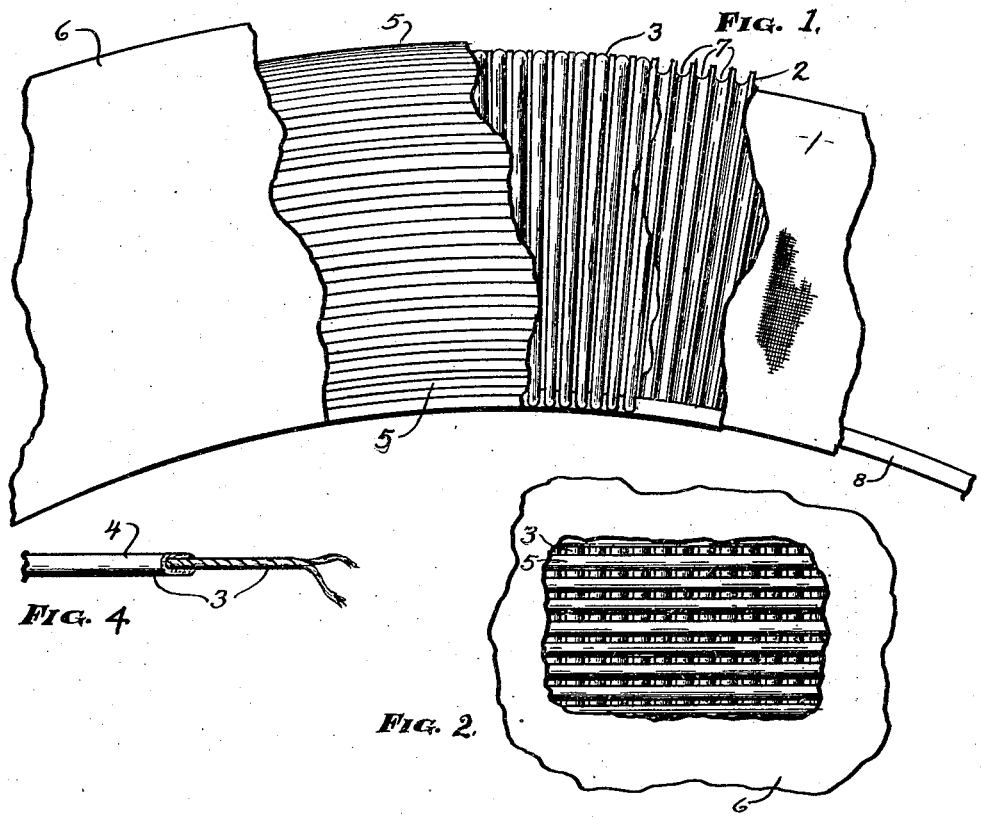
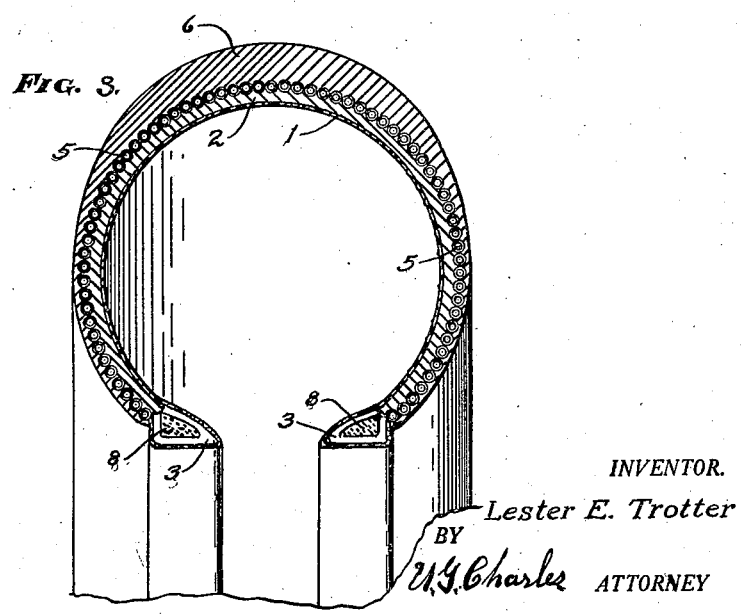
INVENTOR.
Lester E. Trotter
BY
U.J.Charles ATTORNEY Patented Sept. 6, 1927.

1,641,792

UNITED STATES PATENT OFFICE.

LESTER E. TROTTER, OF AUGUSTA, KANSAS.

PNEUMATIC TIRE.

Application filed January 18, 1923. Serial No. 613,428.

My invention relates to improvements in pneumatic tires.

The object of my invention is to provide stronger means by means of using small rope or cord, as a resistance to high tension caused by inflating a tube within said tire with air.

Another object of my invention is to cross wind the tire with an insulated cord or rope imbedding same in a rubber cushion, said cushion being placed next to a fabricated inside lining, and then placing transversely to said winding cords, other cords of the same character.

A further object of my invention is to place the winding cords in a rubber cushion having channels to receive said cords and hold them in position without being vulcanized for the purpose more fully hereinafter specified.

Another object of the invention is to place cords of the kind described and shown, running longitudinal with the casing, so that the strain caused by the wheel pulling the load will tension directly longitudinal on the said cords.

A further object of my invention is that the voids between the cords will be filled with extra quality of resilient rubber, providing a degree of yielding resiliency when contacting an abrupt obstruction on the road, or when the air pressure becomes slack.

Referring to the drawings, like numerals will apply to like parts throughout.

Fig. 1 is a side elevation, parts being removed for convenience of illustration.

Fig. 2 is a detail view with portion of the tread removed to show the mesh of the cords.

Fig. 3 is cross section of the tire.

Fig. 4 is a detailed view of the rubber insulated cord.

1 is the inside fabric lining. 2 is the rubber cushion, which is vulcanized to the lining, said cushion having channels 7, adapted to receive cords 3, said cords being insulated with rubber as shown at 4 in Fig. 4. 5 is a series of cords, running transverse to the cords 3, and contacting firmly against said cords. 6 is the rubber tread of the tire, said tread being vulcanized to the cords 5. The cords 3 are passed around the cushion 2, being interposed within said channels 7 and passing around the core 8 of the bead, and return passing back over the cushion in an adjacent channel, and so on until the process circumscribes the casing, and after which are applied the cords 5, contacting and being firmly attached to said cords 3. The void between said plies of cords and extending longitudinally between cords 5 will be filled with an elastic rubber, the object of which is that the said rubber will yield sufficient to prevent breaking the cords when the casing is severely crimped. It will further be seen that when the casing is caused to collapse by means of deflation, the cords 3 will bend at a right angle instead of having a twisting motion as would be the case if they were passing around the tire diagonally, and the cords 5 will simply position themselves to the deformed condition without unusual crimping on the sides of the tire and as the cords 3 are not vulcanized into the channels 7 there is an opportunity for said cords to slightly slip and not cause the cushion 2 and lining 1 to tear by reason of compression of said cords when the casing is unusually crimped as heretofore mentioned and the rubber insulation 4 on said cords which is vulcanized to said cords 3, will eliminate chafing and wearing of said cord, and said insulation being rubber facilitates a better possibility of vulcanizing the cord members together as heretofore described.

I do not confine myself to any certain number of cords or particular spacing between said cords, neither do I confine myself to the number of plies, all of which conditions are to be considered in the size of tire and strength required. Therefore such modifications may be employed as lie within the scope of the appended claim.

Having thus described my invention, what I claim as new and desire to secure by Letters Patent is;

A tire comprising a fabric lining having a fluted cushion vulcanized thereto, the flutes transversely positioned to the tire, beads engaging with the edges of said lining, rubber insulated cords snugly fitting in said flutes and having a limited movement therein, said cords looping around the bead, a plurality of cords extending transversely on the first said cords, elastic rubber between said cords as resilient connecting means for the adjacent portions of the cords and the edges of the webbing between the flutes or cords.

LESTER E. TROTTER.